(12) United States Patent
Livshits et al.

(10) Patent No.: US 9,753,696 B2
(45) Date of Patent: Sep. 5, 2017

(54) PROGRAM BOOSTING INCLUDING USING CROWDSOURCING FOR CORRECTNESS

(71) Applicant: Microsoft Technology Licensing, LLC, Redmond, WA (US)

(72) Inventors: Benjamin Livshits, Kirkland, WA (US); Robert A. Cochran, Chapel Hill, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 14/212,462

(22) Filed: Mar. 14, 2014

(65) Prior Publication Data
US 2015/0262079 A1    Sep. 17, 2015

(51) Int. Cl.
*G06F 9/44* (2006.01)
*G06N 3/12* (2006.01)

(52) U.S. Cl.
CPC ............... *G06F 8/20* (2013.01); *G06N 3/126* (2013.01)

(58) Field of Classification Search
None
See application file for complete search history.

(56) References Cited

U.S. PATENT DOCUMENTS

| | | | | |
|---|---|---|---|---|
| 6,327,582 B1 * | 12/2001 | Worzel | | G06F 8/30 706/13 |
| 8,037,463 B2 * | 10/2011 | O'Brien | | G06F 8/433 717/149 |
| 2008/0126275 A1 * | 5/2008 | Crnojevic | | G06K 9/6256 706/13 |
| 2011/0307304 A1 | 12/2011 | Mercuri | | |
| 2013/0066693 A1 | 3/2013 | Laird-McConnell et al. | | |
| 2013/0176438 A1 | 7/2013 | Mate et al. | | |
| 2013/0191291 A1 | 7/2013 | Greeson | | |

OTHER PUBLICATIONS

Nickerson, J., and Yasuaki Sakamoto. "Crowdsourcing creativity: Combining ideas in networks." Workshop on information in networks. 2010.*
Veanes, M. et al. "Rex: Symbolic regular expression explorer." Software Testing, Verification and Validation (ICST), 2010 Third International Conference on. IEEE, 2010.*
Mao, Ke, et al. "A Survey of the Use of Crowdsourcing in Software Engineering." RN 15 (2015): 01. <retrieved from cs.ucl.ac.uk>. <retrieved Jun. 3, 2016>.*
Lasecki, et al., "Realtime Crowd Control of Existing Interfaces", In Proceedings of the 24th Annual ACM Symposium on User Interface Software and Technology, Oct. 16, 2011, 10 pages.

(Continued)

*Primary Examiner* — Kakali Chaki
*Assistant Examiner* — Eric Nilsson

(57) ABSTRACT

The subject disclosure is directed towards crowd-based approach to boosting the correctness of a computer program. Results from candidate programs obtained from a first crowd and which may be blended with one another into synthesized programs are sent to a second crowd for evaluation. Based upon the results, a training set evolves and programs are filtered based upon fitness. The process of blending and fitness evaluation with an evolved training set may be iteratively repeated to find a most fit program.

20 Claims, 7 Drawing Sheets

(56) References Cited

OTHER PUBLICATIONS

Quinn, et al., "CrowdFlow: Integrating Machine Learning with Mechanical Turk for Speed-Cost-Quality Flexibility", In Technical Report, HCIL-2010-09, May, 2010, 8 pages.
Bernstein, et al., "Soylent: A Word Processor with a Crowd Inside", In Proceedings of the 23nd Annual ACM Symposium on User Interface Software and Technology, Oct. 3, 2010, 10 pages.
Jeffery, et al., "Arnold: Declarative Crowd-Machine Data Integration", In Sixth Biennial Conference on Innovative Data Systems Research, Jan. 6, 2013, 8 pages.

* cited by examiner

PROGRAM BOOSTING INCLUDING USING CROWDSOURCING FOR CORRECTNESS

BACKGROUND

In software development, a great deal of effort is spent on trying to specify software requirements and on ensuring that software actually matches these requirements. A wide range of techniques have been proposed, including theorem proving, model checking, type-based analysis, static analysis, runtime monitoring and the like. However, in many areas, adoption of these techniques remains inconsistent.

Obtaining a specification or a precise notion of correctness based on a verbal or written description of a programming task in many cases is quite elusive. For example, for many tasks, even expert programmers are unable to get programming tasks correct because of numerous "corner cases" that are often difficult to recognize.

For example, consider coming up with a regular expression to recognize valid email addresses, or to sanitize an input string to avoid SQL injection attacks. Both of these tasks are easy to describe to most developers succinctly, yet both are difficult to implement properly, because of the need to address tricky corner cases. Furthermore, there is room for ambiguity in both tasks; for example, even experienced developers can disagree as to whether john+doe@acm:org or john::doe:@acm:com are valid email addresses, or whether removing all characters outside of the a through z and A through Z set is a valid sanitization strategy for SQL injections. Such examples show how programming tasks are typically under-specified, and that they may not have absolute consensus on what solution is correct. Moreover, different people may get different parts of the task wrong.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards using a first crowd to source programs and a second crowd to evaluate results of those programs. Candidate programs related to a programming task are obtained and synthesized into synthesized programs. Results are generated from the synthesized programs by using training data as input, with information corresponding to the results to a second crowd to obtain feedback. A fitness measure for each program is determined based upon on the training set and the feedback, and used to select a most fit program. The training set may evolve based upon the feedback and the programs may be re-synthesized iteratively to attempt to keep improving the fitness measures until a suitable stopping criterion is met.

In one or more aspects, a program selection mechanism obtains candidate programs received from a first crowd source and generates results from the candidate programs and/or from blended programs synthesized from the candidate programs. Information corresponding to the results is provided to a second crowd source, with feedback from the second crowd processed into evaluation data. Fitness data for each of the programs may be determined based at least in part on the evaluation data, to output at least one selected program based upon the fitness data.

One or more aspects are directed towards blending a set of programs into synthesized programs and generating results from the synthesized programs using training data in a current state. Information corresponding to the results is provided to a second crowd source, with feedback on the results received from the second source crowd processed to evolve the training data into a new current state. Fitness data is determined for and associated with each of the synthesized programs. The programs are filtered based on each program's associated fitness data to obtain a new set of programs, which are then iteratively blended again and so on until the fitness data associated with a program achieves a desired fitness level or another stopping criterion is met. A program is selected (e.g., the most fit program) based upon the fitness data associated with that program.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a block diagram representing example components of an algorithm used for statically analyzing program code with respect to proper use of opt-in consent prompts, according to one or more example implementations.

DETAILED DESCRIPTION

Figure 1:
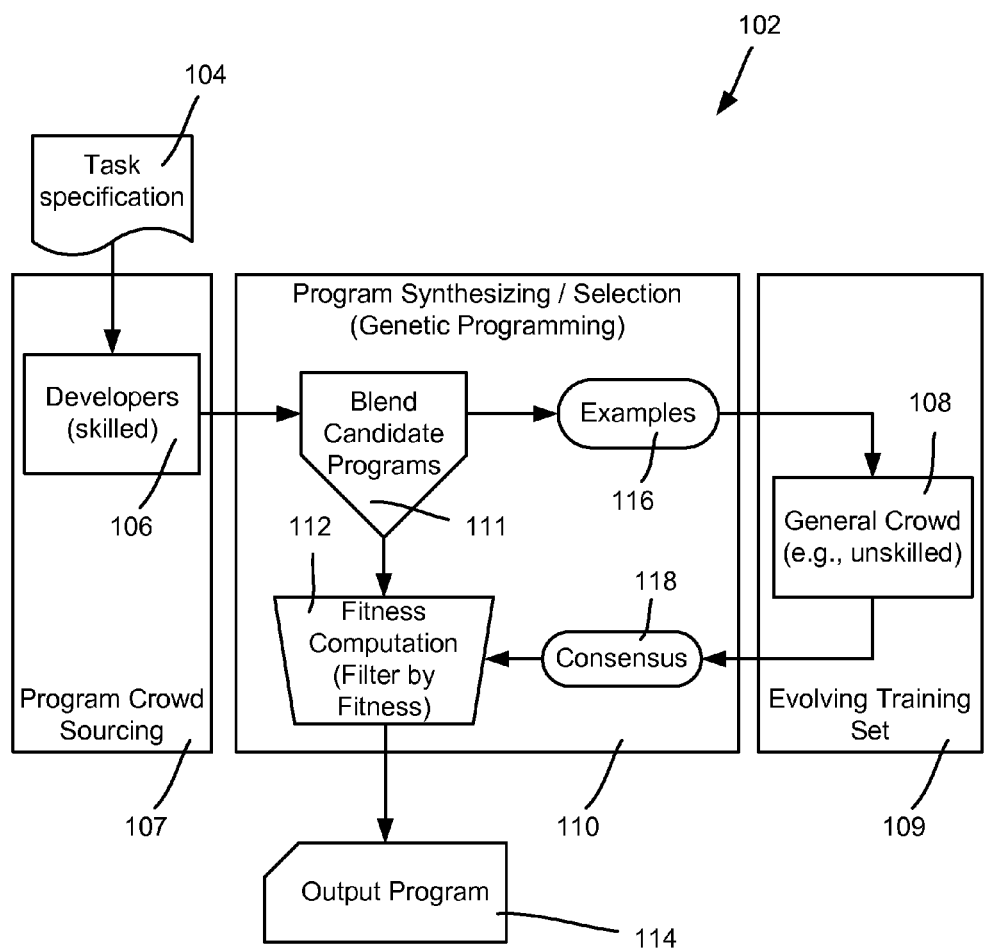
FIG. 1 is a block diagram representing example components configured to use crowds to boost program correctness, according to one or more example implementations.

Various aspects of the technology described herein are generally directed towards a crowdsourced solution to programming tasks, in which the crowd boosts program correctness (where "boost" refers to improving a programming task, not necessarily getting the task perfect). In general, as described herein, program boosting generally comprises a semi-automatic program generation/synthesis technique that uses a set of initial crowdsourced candidate programs and combines (or blends) them to provide a better result, according to a fitness function. For example, a task in question may be described in words, with ambiguities and under-specified corner cases. The crowd is used to arrive at a solution/answer, without necessarily knowing what the proper solution/answer is in advance.

In one or more implementations, a two-crowd approach is employed. One crowd is considered "skilled" with respect to programming tasks and thus provides the candidate programs, whereas the other crowd may be a general public crowd, (which is presumed to be unskilled, but there is no reason skilled people cannot be part of the general public crowd). In general, in the two-crowd approach, the skilled crowd helps collect, or source candidate programs, which are thereafter refined by asking the general crowd about the correct behavior on questionable cases. Note that a general crowd is typically used for cost purposes, as they are cheaper then engaging skilled workers for refinement tasks that do not require programming skill; notwithstanding, this is only one model, and other models, including one that solely uses a skilled crowd, or two skilled crowds, or a semi-skilled crowd (e.g., having some knowledge of programming that is not necessarily the same as the crowd that sources the programs), may be alternatively used.

Thus, described herein is obtaining correct problems and solutions, which involves crowdsourcing partially correct solutions from developers on crowdsourcing services and then blending these programs together in a way that improves their correctness or accuracy on examples of interest. Boosting by blending the crowdsourced results together frequently yields results that are better than any individual responses.

It should be understood that any of the algorithms, code, examples and/or descriptions herein are non-limiting. For example, example programs are described herein that consume a single input and produce a binary (yes/no) output; for any input, a non-specialist computer user (in the general crowd) can decide and vote if the answer for it as being correct is yes or a no. Asking a user for a rating or other non-binary output is an alternative to such yes/no output, e.g., other, non-binary evaluation techniques such as multiple choice, fill in the blanks and so forth may be used instead of or in addition to binary evaluation techniques. A general observation is that while the general crowd may not help develop programs, they are able to recognize correct or incorrect program behaviors.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, programming and crowdsourcing in general.

FIG. 1 shows a generalized block diagram of a system 102 in which a solution to a specified task 104 is desired. In one or more implementations, to crowdsource a solution to the specified task 104, the system 102 leverages two crowds, namely a developer crowd 106 (for program crowdsourcing 107) and a general crowd 108 (for evolving a training set 109). For example, the developer crowd 106 may correspond to developers for hire, typically skilled in one or more computer programming languages such as Java and C++. The general crowd 108 may correspond to any suitable crowdsource service or the like, typically workers unskilled with respect to program development (although nothing precludes skilled developers from being part of the general crowd 108). Notwithstanding, any "crowd" as described herein is not limited by conventional crowdsourcing solutions. For example, the developer crowd 106 may be a team of employees and/or contractors of a large enterprise. Similarly, the general crowd 108 may range from random for-hire online workers to an enterprise's employees, contractors, volunteers or contributors (e.g., gamers who earn points for their answers) and so forth.

As described herein, one type of program boosting may be based upon synthesizing (block 110) the candidate programs via genetic programming concepts. In general, in genetic programming the candidate programs are blended in one operation 111, and filtered by a fitness computation 112 into an output program 114. In the system 102 of FIG. 1, examples 116 from the candidate programs are provided to the general crowd to review, with consensus 118 (feedback or the like) used in the filtering by the fitness computation 112. In general, the training set 109 evolves based upon the general crowd's responses, whereby a most fit, (typically) blended program emerges as the output program 114.

The following table presents an example program boosting algorithm, implemented as an iterative genetic programming algorithm, as pseudocode:

```
1:  Input: Programs σ, examples Φ, crossover function β, mutation
    function μ, example generator δ, fitness function η, budget θ
2:  Output: Boosted program
3:  function Boost((σ, ε), β, μ, δ, η, θ)
4:      while (η̂ < 1.0 ∧ θ > 0) do         ▷ Til perfect, or no money
5:          φ = ∅                          ▷ New examples for this generation
6:          for all (σ_i, σ_j) ∈ FindCrossoverCandidates(σ) do
7:              for all σ' ∈ β((σ_i, σ_j)) do    ▷ Crossover σ_i and σ_j
8:                  φ = φ ∪ δ(σ', Φ)             ▷ Generate new examples
9:                  σ = σ ∪ {σ'}                 ▷ Add this candidate to σ
10:             end for
11:         end for
12:         for all (σ_i) ∈ FindMutationCandidates(σ) do
13:             for all σ' = μ(σ_i) do           ▷ Mutate σ_i
14:                 φ = φ ∪ δ(σ', Φ)             ▷ Generate new example
15:                 σ = σ ∪ {σ'}                 ▷ Add this candidate to σ
16:             end for
17:         end for
                                          ▷ Get consensus on these new examples via mturk
18:         (Φ_φ, θ) = GetConsensus(φ, θ)         ▷ and update budget
19:         Φ = Φ ∪ Φ_φ                          ▷ Add the newly acquired examples
20:         σ = Filter(σ)                        ▷ Update candidates
21:         (σ̂) = GetBestFitness (σ, η)
22:     end while
23:     return σ̂                               ▷ Return program with best fitness
24: end function
```

With respect to the above example algorithm, let $\Sigma$ be the set of programs and $\Phi$ be the set of examples. In every generation, the set of currently considered programs $\sigma \subset \Sigma$ and the set of current examples $\phi \subset \Phi$ are updated. Note that the algorithm is iterative in nature, in that the process of boosting proceeds in generations, similar to the way genetic programming is typically implemented. An overall goal is to find a program with the best fitness in the set of programs $\Sigma$. At each generation, new examples in $\phi$ are produced and sent to the general crowd 108 to obtain consensus 118. The algorithm is parameterized as follows:

$\sigma \subset \Sigma$ is the initial set of programs;

$\phi \subset \Phi$ is the initial set of positive and negative examples;

$\beta: \Sigma \times \Sigma \to 2^\Sigma$ is a crossover function that takes two programs and produces a set of possible programs;

$\mu: \Sigma \to 2^\Sigma$ is a mutation function that produces a set of possible programs;

$\delta: \Sigma \times 2^\Phi \to 2^\Phi$ generates new training examples;

$\eta: \Sigma \to \mathbb{N}$ is the fitness function $\theta \in \mathbb{N}$ is the budget for crowdsourcing.

By way of example, described below is implementing operations that correspond to functions $\beta$, $\mu$, $\delta$ and $\eta$ for regular expressions using symbolic finite automata (SFAs) in one example implementation. Note that the number of iterations may be set to a limit such as ten. Moreover, one or more implementations benefit from parallelism; more particularly, the "for" loops of the above algorithm may run in parallel. The call-outs to the crowd to get the consensus may be synchronous, but function more efficiently if made asynchronously.

Symbolic finite automata (SFA) is an alternative to classical automata; (additional details of SFAs may be found in U.S. Pat. No. 8,515,891 (hereby incorporated by reference) and in the publication by M. Veanes and N. Bjorner, "*Symbolic automata: The toolkit*" In TACAS, pages 472-477, 2012. In general, symbolic finite automata extends classical automata with symbolic alphabets. In an SFA graph, each edge is labeled with a predicate, rather than being limited to a single input character. This allows the automaton to represent multiple concrete transitions succinctly. Regular expressions (regexes) may be represented in SFAs.

In general, in a symbolic finite automaton (SFA) A, A is a tuple (B, Q, $q_0$, F, δ) where B is a decidable Boolean algebra, called the alphabet, Q is a finite set of states, $q_0 \in Q$ is the initial state, $F \subseteq Q$ is the set of final states, and $\delta \subseteq Q \times P_B \times Q$ is a finite set of moves or transitions; ($P_B$ is a set of predicates).

Figure 2:
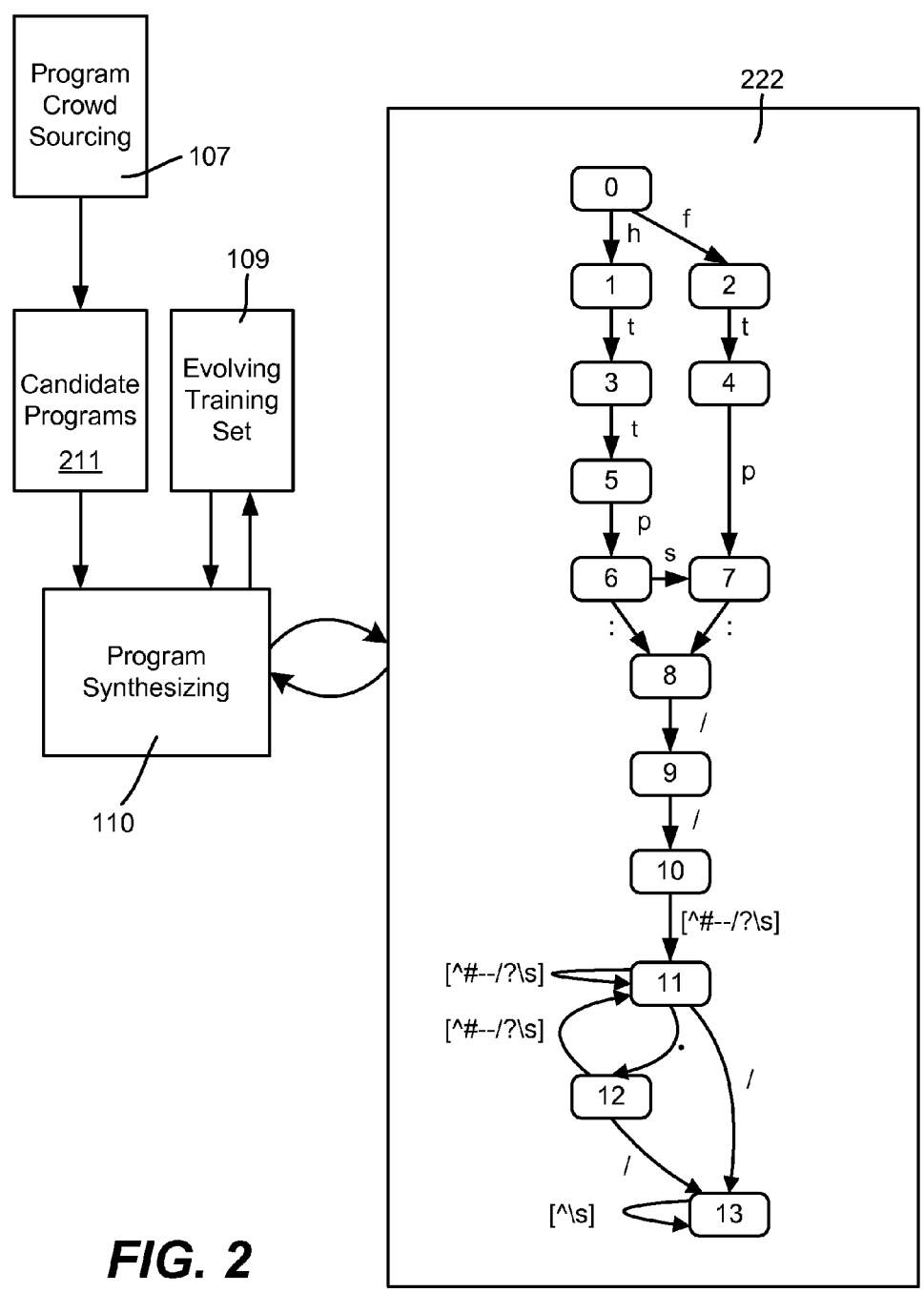
FIG. 2 is a representation of how program input processing may be represented as a symbolic finite automaton, according to one or more example implementations.

FIG. 2 shows how a URL may be described in SFA (block 222). The transitions between the numbered states are labeled with valid symbols, e.g., from state zero (0) to ten (10), the valid strings are "HTTP://" "HTTPS://" or "FTP://" in this example. After that, ranges of valid symbols are provided.

With respect to the fitness computation 112 (FIG. 1), as part of the genetic programming approach employed in one or more implementations of program boosting, the fitness of a particular program needs to be assessed. For regular expressions, for example, this amounts to calculating the accuracy on a training set. The process of fitness calculation can by itself be time consuming, because running a large set of examples and counting how many of them are accepted correctly by each produced SFA is a process that scales quite poorly when dealing with thousands of SFAs and hundreds of examples. Thus, described herein is a mechanism to "melt" positive and negative examples into SFAs P and N, which represents the languages of all positive and all negative examples, respectively. For any SFA A, the system may compute the cardinality of intersection sets $A \cap P$ and $N \setminus A$, which can be computed fast. The accuracy can be then computed as:

$$\frac{|A \cap P| + |N \setminus A|}{|P| + |N|}$$

One challenge inherent in refining a training set is that the evolved example training set 109 can significantly deviate from an initial "gold" training set. While imperfect, the gold set is still treated as a more reliable source of truth. To this end, weighting may used to give the gold set a higher weight in the overall fitness calculation. In one implementation, reliably good results were obtained with the ratio of gold: evolved weights set to 9:1.

Figure 3:
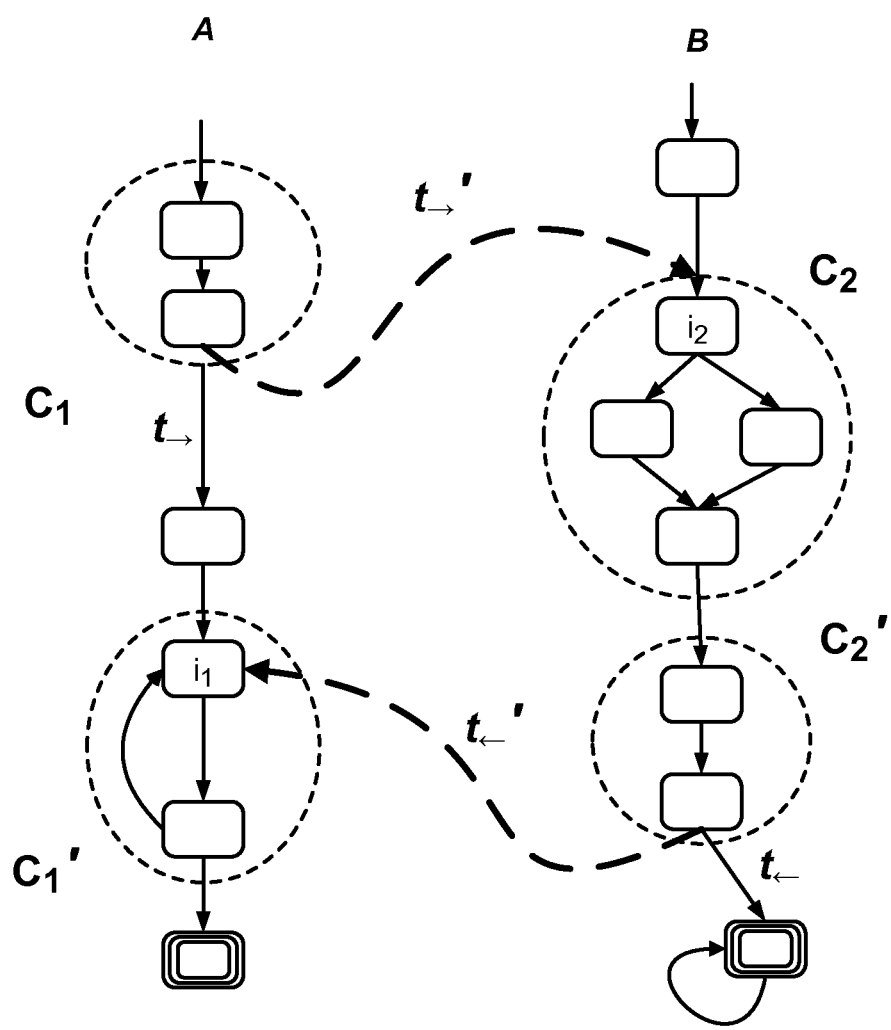
FIGS. 3 and 4 are representations of how programs may be blended by swapping parts with each other, according to one or more example implementations.
Figure 4:
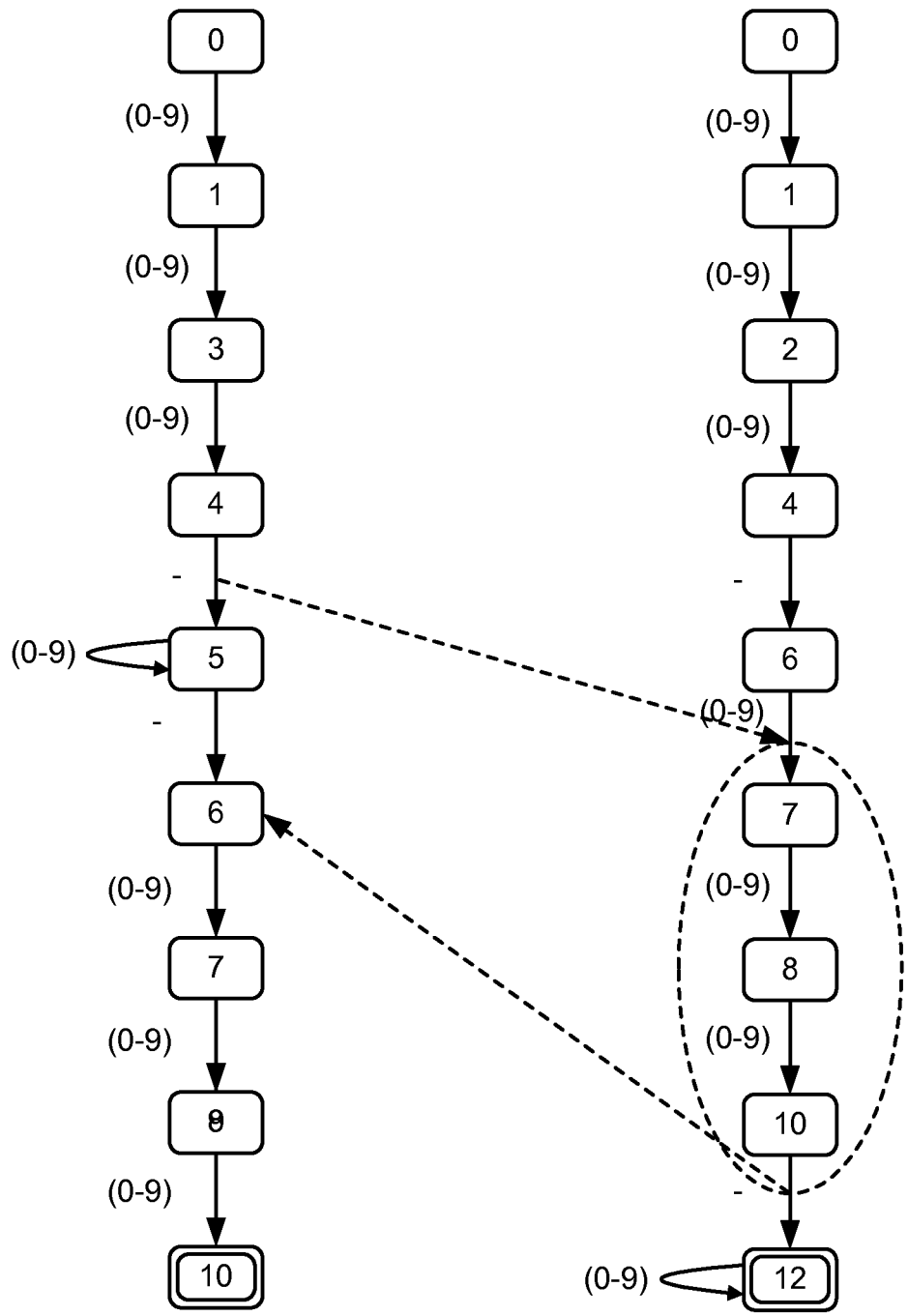

Turning to another aspect, a crossover interleaves two SFAs into a single SFA that "combines" their behaviors. Given two SFAs A and B, as generally represented in FIG. 3, the crossover algorithm redirects two transitions, one from A to B, and one from B to A. A goal of such an operation is that of using a component of B inside A. FIG. 4 shows this concept with SFAs.

One suitable crossover algorithm is shown in the table below:

---

Input: SFAs $A_1 = (Q_1, q_0^1, F_1, \delta_1)$, $A_2 = (Q_2, q_0^2, F_2, \delta_2)$
Output: All crossovers of $A_1$ and $A_2$
function CROSSOVERS($A_1$, $A_2$)
   $C_1$ := COMPONENTS($A_1$)
   $C_2$ := COMPONENTS($A_2$)
   for all $c_1 \in C_1$ do
     $C'_1 := \{c'_1 \mid c_2 \prec_{A_1} c'_1\}$
     for all $t_\rightarrow = (p_1, \phi, p_2) \in$ EXIT_MOVES($c_1$, $A_1$) do
       for all $c_2 \in C_2$ do
         for all $i_2 \in$ ENTRY_STATES($c_2$, $A_2$) do
           $C'_2 := \{c'_2 \mid c_2 \prec_{A_2} c'_2\}$
           for all $c'_2 \in C'_2$ do
              for all $t_\leftarrow = (q_1, \phi, q_2) \in$ EXIT_MOVES($c'_2$, $A_2$) do
                for all $c'_1 \in C'_1$ do
                   for all $i_1 \in$ ENTRY_STATES($c'_1$, $A_1$) do
                     $t'_\rightarrow := (p_1, \phi, i_2)$, $t'_\leftarrow := (q_1, \phi, i_1)$
                     $\delta_{new} := \delta_1 \cup \delta_2 \setminus \{t_\rightarrow, t_\leftarrow\} \cup \{t_\rightarrow, t'_\leftarrow\}$
                     yield return $(Q_1 \cup Q_2, q_0^1, F_1 \cup F_2, \delta_{new})$
end function
function EXIT_MOVES(c, A)
   return $\{(p, \phi, q) \in \delta_A \mid p \in c \wedge p' \notin c\}$
end function
function ENTRY_STATES(c, A)
   return $\{q \in Q_A \mid \exists (p, \phi, q) \in \delta_A . p \notin c \wedge p' \in c \vee q = q_0^A\}$
end function

---

Note however, that an SFA can have many transitions, whereby trying all the possible crossovers can be impractical. Concretely, if A has $n_1$ states and $m_1$ transitions, and B has $n_2$ states and $m_2$ transitions, then there will be $O(n_1 n_2 m_1 m_2)$ possible crossovers. Checking fitness for these many SFAs does not scale.

Described are heuristics that try to limit the number of possible crossovers. One technique guarantees that: 1) if the algorithm leaves A by redirecting a transition (q, φ, $q_1$), and comes back on state $q_2$, then $q_2$ is reachable from $q_1$, but different from it, ($q_1 < q_2$ is written); and 2) if the algorithm reaches B in a state $p_1$, and we leave it by redirecting a transition ($p_2$, φ, p), then $p_2$ is reachable from $p_1$ ($p_1 \leq p_2$ is written). These two approaches avoid generating crossovers for which the redirected transition does not lead to any final state. Other heuristics may include limiting the number of "interesting" edges and states to be used in the algorithm by grouping multiple states into single component and only considering those edges that travel from one component to another one, for example.

In the above crossover algorithm the reachability relation < is naturally extended to components (set of states). The function COMPONENTS return the set of state components computed using one of the heuristics described herein.

Turning to one strategy, states that belong to a single strongly connected component (SCCs) may be collapsed. Strongly connected components are easy to compute and often capture interesting blocks of the SFA.

However, in several cases strongly connected components do not collapse enough states. For example, in the SFA 222 represented in FIG. 2, the only strongly connected component with more than one state is the set {11-12}. To address this limitation a collapsing strategy for "stretches" is provided herein, wherein a stretch is a maximal connected acyclic subgraph where every node has degree smaller or equal to two. In the SFA 222 of FIG. 2, on the right {1, 3, 5}, {2, 4}, and {9, 10} are stretches.

Even when using stretches the collapsing is often ineffective. Consider the SFA 222 of FIG. 2. The set of nodes {0, 1, 2, 3, 4, 5, 6, 7, 8} looks as it if should be treated as a single component, because it has a single entry point, and a single exit point, however it is not a stretch. This component clearly captures an independent part of the regex that accepts the correct protocols of a URL. Such component is characterized by the following features:

1. it is a connected direct acyclic subgraph,
2. it has a single entry and exit point,
3. it does not start or end with a stretch, and
4. it is maximal, as it is not contained in a bigger component with properties 1-3.

Such components can be computed in linear time by using a variation of depth-first search starting in each node with in-degree smaller than 1. The property 4) is achieved by considering the nodes in topological sort (since strongly connected components are already collapsed the induced graph is acyclic). Because this technique is generally more effective than stretches, it may be used before the stretch collapsing.

In the SFA 222 of FIG. 2, the final components are: {0, 1, 2, 3, 4, 5, 6, 7, 8}, {9, 10}, {11, 12}, and {13}. If A has $c_1$ components and $t_1$ transitions between different components, and B has $c_2$ components and $t_2$ transitions between different components, then there will be $O(c_1 c_2 t_1 t_2)$ possible crossovers. In practice this number is much smaller than $O(n_1 n_2 m_1 m_2)$.

One way crossovers are a variant of those described above in which one edge is redirected from A to B, but not coming back to A on any edge. This roughly corresponds to removing lines 11-15 from the crossover algorithm. If A has $t_1$ transitions between different components, and B has $c_2$ components, then there will be $O(c_2 t_1)$ possible one-way crossovers.

Figure 5:
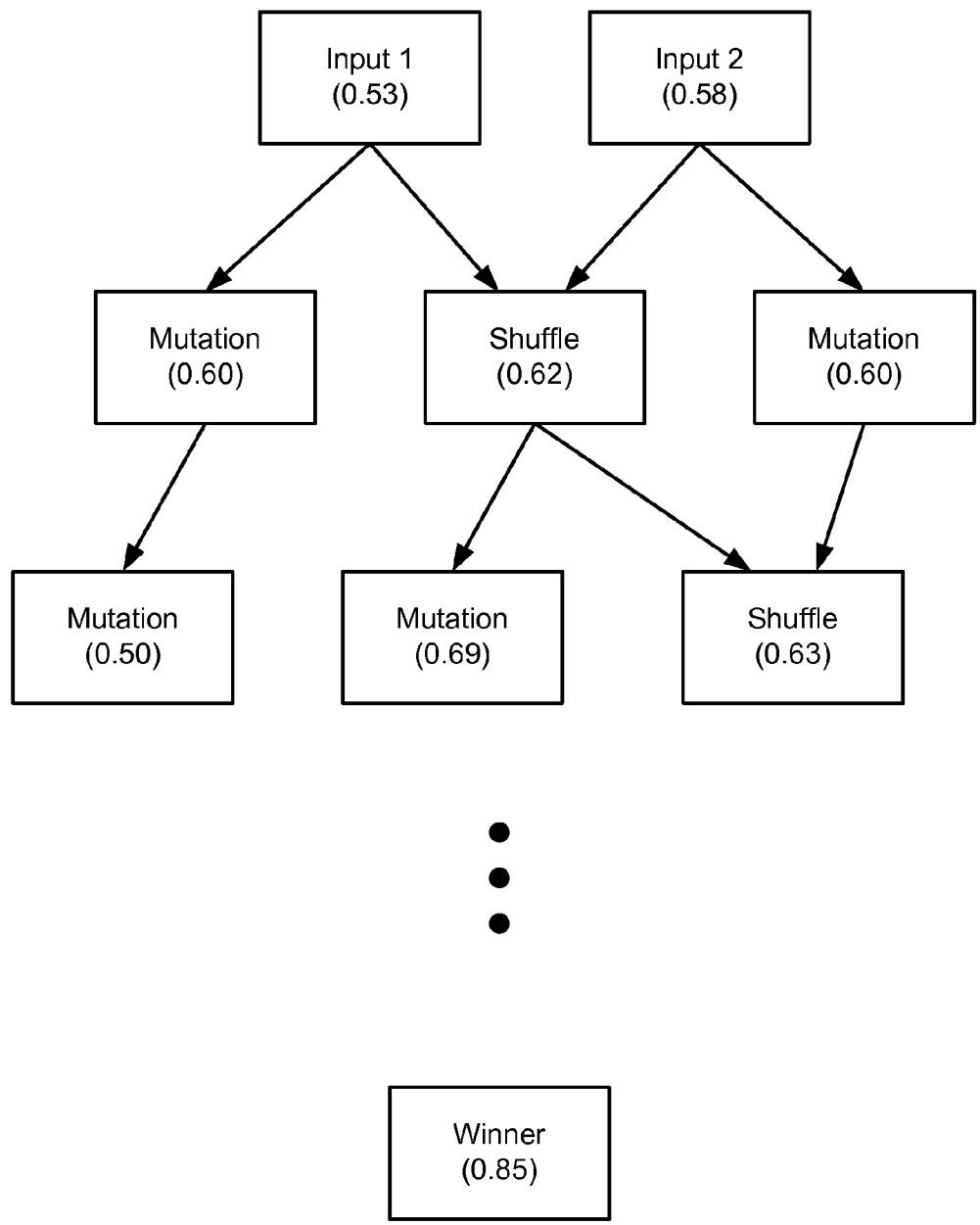
FIG. 5 is a representation of how genetic programming concepts may be used with crowd sourced programs and crowd-provided feedback to select a program, according to one or more example implementations.

As classically defined, a mutation operator alters one or more values of the input producing a mutation, as generally represented in FIG. 5. In one implementation described herein, the inputs have too many values to be altered (every transition can carry 216 elements), whereby a "blind" approach would produce too many mutations to be practical. Thus, a guided approach may be used, in which mutations take as input an SFA A and a counterexample s, such that s is incorrectly classified by A (s is in the target language but not in L(A), or s is not in the target language but it is in L(A)). Using this extra bit of information A is mutated only in ways that cause s to be correctly classified. The intuition behind such operations is to perform a minimal syntactical change in order to correctly classify the counterexample. Let $L_T$ be the target language. Based on whether the counterexample s belongs or not to $L_T$, two type of mutations are devised, namely diminishing mutations and augmenting mutations.

With respect to diminishing mutations: given a string $s \notin L_T$ and a SFA A such that $s \in L(A)$ generates a SFA $A_0$, such that $L(A_0) \subseteq L(A)$ and $s \notin L(A_0)$. Given a string $s=a_1 \ldots a_n$ that is accepted by A, the algorithms finds a transition $(q, \phi, q0)$ that is traversed using the input character $a_i$ (for some i) when reading s and either removes the whole transition, or simply shrinks the guard to $\phi \wedge \neg a_i$ disallowing symbol $a_i$. Given a string of length k, this mutation can generate at most 2 k mutated SFAs. When there exists a state $q \in F$ such that $\delta^*(q_0, s)=q$ output $A=(q_0, Q, F \backslash \{q\}, \delta)$ is also generated, in which the input SFA is mutated by removing a final state.

With respect to augmenting mutations, given a string $s \in L_T$ and a SFA A such that $s \notin L(A)$ generates a SFA $A_0$, such that $L(A_0) \subseteq L(A)$ and $s \in L(A_0)$. The input $A=(q_0, Q, F, \delta)$ is a partial SFA (in that some nodes have undefined transitions). Given a string $s=a_1 \ldots a_n$ that is not accepted by A, the algorithm finds a state q such that, for some i, $\delta^*(q_0, a_1 \ldots a_i)=q$, and a state q' such that, for some j>i, $\delta^*(q', a_1 \ldots a_j) \in F$. Next, it adds a path from q to q' on the string $a_{mid}=a_{i+1} \ldots a_{j+1}$. This is done by adding $|a_{mid}|-1$ extra states. The string s is now accepted by the mutated SFA $A_0$. Given a string of length k and a SFA A with n states this mutation can generate at most $nk^2$ mutated SFAs. When there exists a state q such that $\delta^*(q_0, s)=q$ also output is $A=(q_0, Q, F \cup \{q\}, \delta)$, in which the input SFA is mutated by adding a new final state.

Generating one string is sometimes not enough to "characterize" the language of an SFA. For each SFA $A=(Q, q_0, F, \delta)$, a set of strings S is generated, such that for every state $q \in Q$, there exists a string $s=a_1 \ldots a_n \in L(A)$, such that for some i $\delta^*(q_0, a_1 \ldots a_n)=q$. Informally, a goal is to generate a set of strings covering all the states in the SFA. This technique is motivated by the fact that the SFA is kept minimal, and in a minimal SFA each state corresponds to a different equivalence class of strings. An example generation algorithm is set forth below: it terminates in at most |Q| iterations.

```
1:   Input: SFA A = (Q, q, F, δ) and "seed" string w
2:   Output: Set of new training strings
3:   function COVER(A, w)
4:     C := Q
5:     while C ≠ ∅ do
6:       q := REMOVE_FIRST (Q)
7:       A' := SFA_PASSING(A, q)
8:       s := CLOSEST_STRING(A, w)
9:       C := C \ STATES_COVERED (s, A)
10:      yield return s
11:    end while
12:  end function
13:  // Language of all strings in A passing through state q
14:  function SFA_PASSING (A, q)
15:    return CONCATENATE((Q, q_0, {q}, δ), (Q, q, F, δ))
16:  end function
```

As can be readily appreciated, the algorithm generates a new string at every iteration, which is forced to cover at least one state which has not been covered yet. Note that this naïve approach tends to generate strings that look "random" sometimes causing untrained crowd workers to be overly conservative by classifying them as negative examples, even when they are not. For example, in the case of URLs, strings containing upper Unicode elements such as Chinese characters may be obtained, which look unfamiliar to US-based workers.

This problem may be solved by using the knowledge encoded in the training set of inputs, by choosing to look for strings in A that are close to some example string e. This notion of closeness may be formalized by using the classical metric of string edit distance. Formally, an edit is a character insertion, character deletion or character replacement Character insertion: given a string $a_1 \ldots a_n$, and a symbol $b \in \Sigma$, create $a_1 \ldots a_i b a_{i+1} \ldots a_n$, Character deletion: given a string $a_1 \ldots a_n$, create $a_1 \ldots a_{i-1} a_{i+1} \ldots a_n$, or Character replacement: given a string $a_1 \ldots a_n$, and a symbol $b \in \Sigma$ different from $a_i$, create $a_1 \ldots a_{i-1} b a_{i+1} \ldots a_n$.

The edit distance between two strings s and s', ED(s, s') is the minimum number of edits that transforms s into s'. Next, the problem can be reformulated as: given a string e (from the training input), and an SFA A, find a string $s \in L(A)$ such that the edit distance between e and s is minimal. Let witnesses(A, e)={s |∀t∈L(A).ED(s, e)≤ED(t, e)} be the set of strings in L(A) at minimal edit distance from e. A known algorithm to compute the minimum edit distance is modified to generate the witness string.

Figure 6:
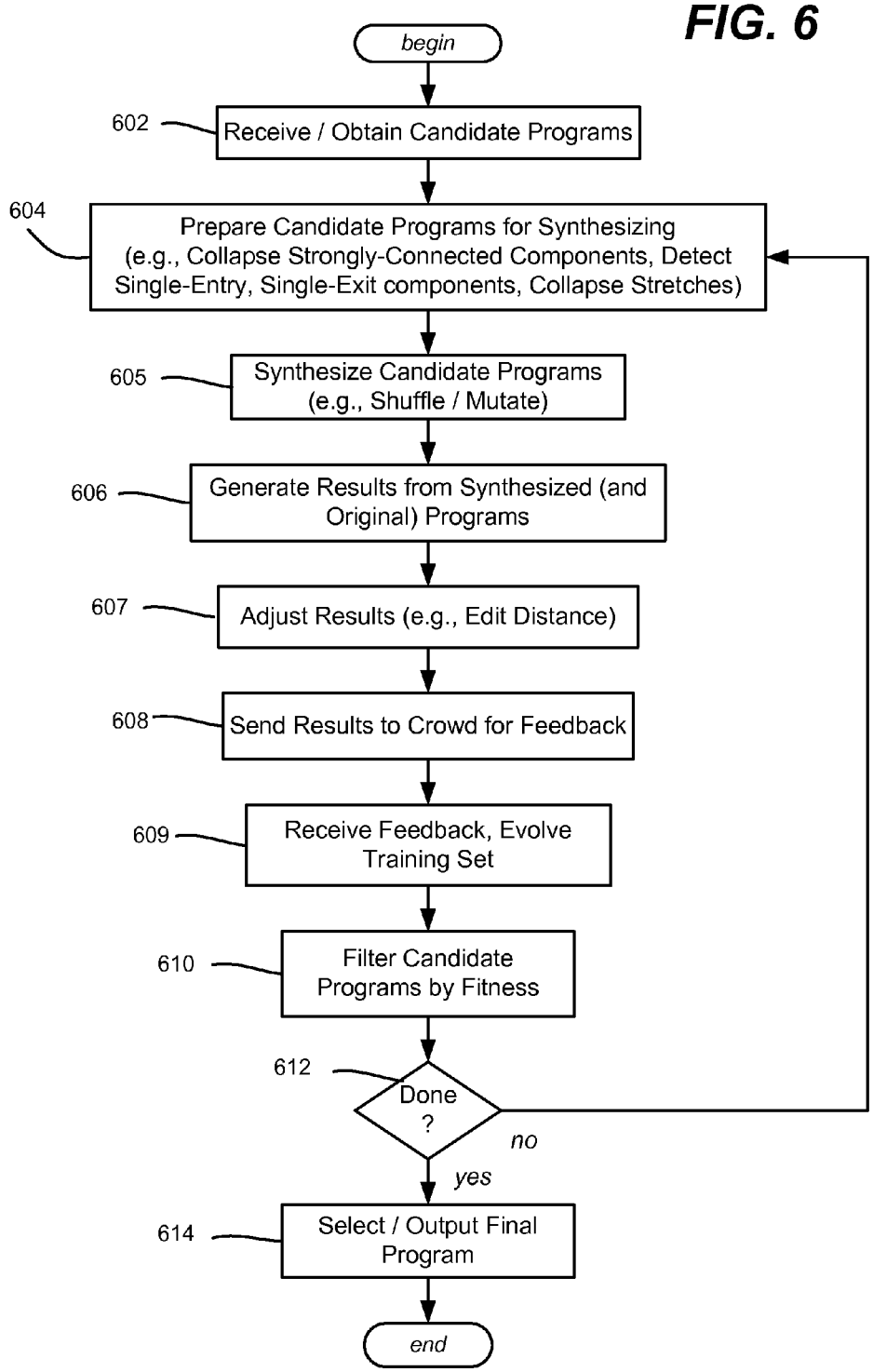
FIG. 6 is a flow diagram representing example steps of an iterative genetic algorithm used to blend programs and evaluate the fitness thereof to select a most fit program, according to one or more example implementations.

FIG. 6 is a flow diagram summarizing various aspects described herein, beginning at step 602 where the candidate programs are received from a source, e.g., the developer crowd. Steps 604-610 represent example steps of the program boosting algorithm (set forth above in pseudocode). For example, steps 604 and 605 represent the crossover and mutation operations for each candidate program, while step 606 generates the results from each program and the training set. Note that the original candidate programs (non-blended) may be used to generate results as well, as there is a possibility that one or more of the original programs are more fit than any blended one. As described above, the results may be adjusted at step 607, such as via known edit distance technology, so as to assist the general crowd in making decisions.

The crowd receives the results via step 608, such as lists of strings to evaluate for correctness judgment. The general crowd feedback is used to evolve the training set, as represented at step 609. Step 610 filters the candidate programs by fitness.

Step 612 iterates (e.g., the while loop) until done, e.g., the resulting program meets the desired fitness criteria or the crowdsourcing budget is used up. At this time, the most fit program has been determined and output as represented by step 614.

As can be seen, there is provided a crowdsourcing approach to program synthesis referred to as program boosting. Difficult programming tasks, which even expert developers have trouble with, benefit from the wisdom of the crowds, such as a crowd of skilled developers and a crowd of untrained computer workers that successfully produce solutions to complex tasks such as those that involve crafting complex regular expressions.

Example Operating Environment

Figure 7:
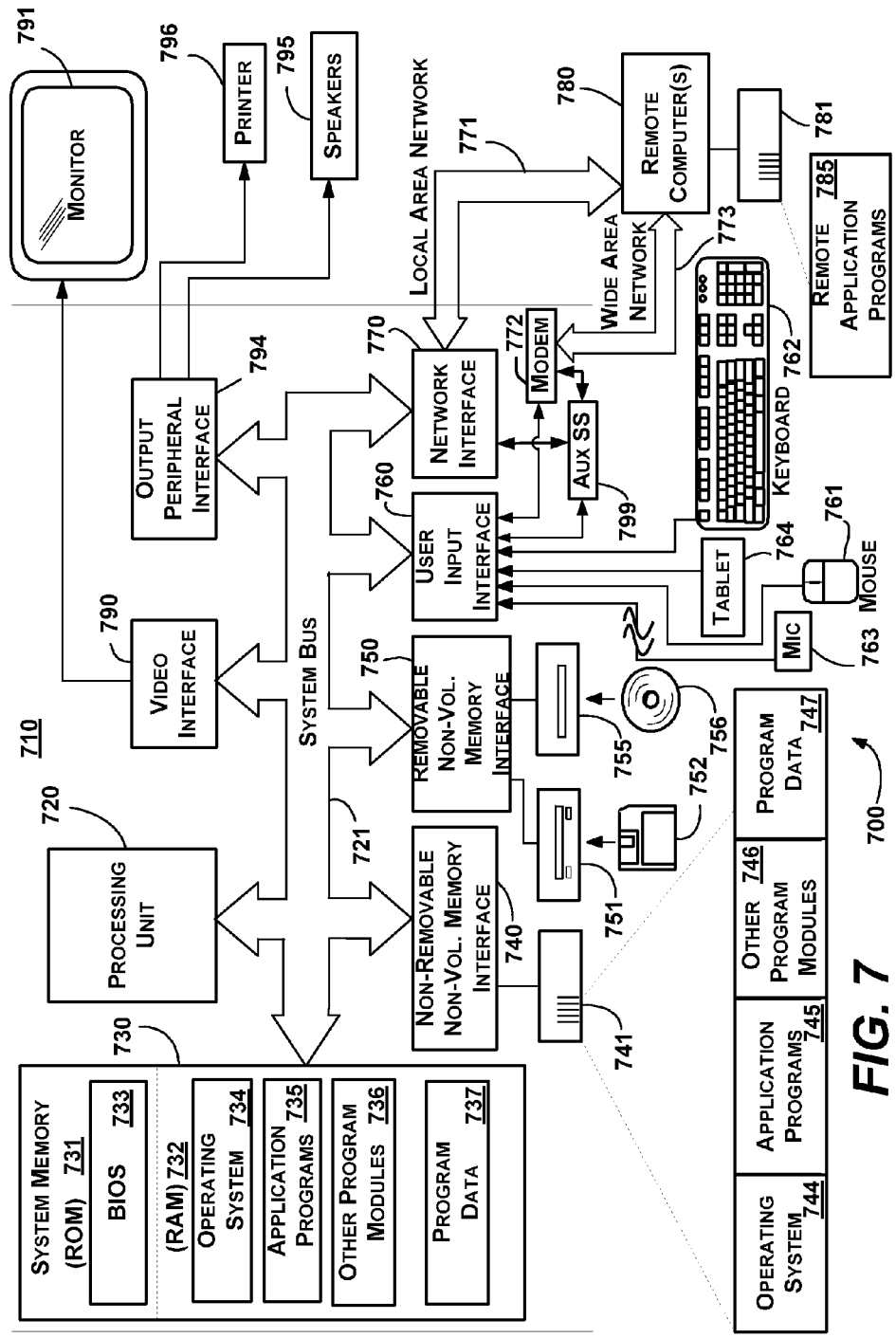
FIG. 7 is a block diagram representing an exemplary non-limiting computing environment and system into which one or more aspects of various embodiments described herein can be implemented.

FIG. 7 illustrates an example of a suitable computing and networking environment 700 into which the examples and implementations of any of FIGS. 1-6 may be implemented, for example. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the example operating environment 700.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an example system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, solid-state device memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the example operating environment include, but are not limited to, magnetic tape cassettes, solid-state device memory cards, digital versatile disks, digital video tape, solid-state RAM, solid-state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are examples and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed by at least a processing unit, the method comprising;
    obtaining candidate programs related to a programming task;
    synthesizing the candidate programs to produce blended programs;
    providing positive examples and negative examples from the blended programs to crowd Sources;
    obtaining a training set and feedback from the crowd sources;
    determining fitness measures for the blended programs based on the training set and the feedback, the fitness measures including calculating an accuracy of the training set, the accuracy of the training set being based on a first symbolic finite automaton for the positive examples, a second finite automaton for the negative examples and a third symbolic finite automaton for the blended programs; and
    selecting a most fit blended program from the blended programs based upon the fitness measures and using the selected most fit blended program for the programming task.

2. The method of claim 1, wherein the method further comprises evolving a next training set by combining data of the training set and feedback-related data into the next training set.

3. The method of claim 2, wherein combining the data of the training set and the feedback-related data into the next training set comprises weighing the data of the training set differently from the feedback-related data.

4. The method of claim 1, wherein obtaining the candidate programs comprises receiving the candidate programs from a first crowd source that is different from the crowd sources from which the feedback is obtained.

5. The method of claim 1, wherein obtaining the candidate programs comprises receiving programs corresponding to regular expressions.

6. The method of claim 1, wherein synthesizing the candidate programs comprises using a crossover function.

7. The method of claim 6, wherein using the crossover function comprises using a first component of a first program in a second program and using a second component of the second program in the first program.

8. The method of claim 7, further comprising detecting a set of single-entry, single-exit components as an independent part of a program and using the independent part as the first component.

9. The method of claim 1, wherein the accuracy of the training set is computed by performing one or more operations on a first intersection between the first symbolic finite automaton and the third symbolic finite automaton and a second intersection between the second symbolic finite automaton and the third symbolic finite automaton and values of the first symbolic finite automaton and the second symbolic finite automaton.

10. The method of claim 1, wherein synthesizing the candidate programs comprises using a mutation function.

11. The method of claim 1, wherein obtaining the candidate programs comprises receiving programs corresponding to regular expressions, in which the regular expressions are represented with symbolic finite automata.

12. The method of claim 1, wherein providing the positive examples and the negative examples comprises generating strings.

13. The method of claim 12, wherein generating the strings comprises using at least one of: string edit distance, character insertion, character deletion or character replacement.

14. In a computing environment, a system comprising;
memory configured with a program selection mechanism;
at least one processor coupled to the memory to execute the program selection mechanism, and
the program selection mechanism configured to:
 a) obtain candidate programs related to a programming task from a first crowd source;
 b) generate results from blended programs synthesized from the candidate programs;
 c) provide information corresponding to the results to a second crowd source;
 d) obtain training data and feedback from the second crowd source;
 e) process the feedback from the second crowd source into evaluation data;
 f) determine fitness data for the blended programs based at least in part on the evaluation data, wherein determining fitness data includes calculating an accuracy of the training data, wherein the accuracy of the training data is based on a first symbolic finite automaton for positive examples in the training data, a second finite automaton for negative examples in the training data, and a third symbolic finite automaton for the blended programs; and
 g) output a most fit blended program for the programming task from amongst the blended programs based upon the fitness data.

15. The system of claim 14, wherein the program selection mechanism is further configured to iteratively select and further blend programs based upon the fitness data before outputting the at least one blended program.

16. One or more machine-readable storage media or hardware logic having machine-executable instructions, which when executed by one or more processors, perform operations comprising:
 a) blending a set of programs obtained from a first crowd source into synthesized programs, the set of programs relating to a programming task;
 b) generating results from the synthesized programs using training data in a current state;
 c) providing information corresponding to the results to a second crowd source;
 d) processing feedback from the second crowd source to evolve the training data into a new current state;
 e) determining fitness data for each of the synthesized programs, and associating each synthesized program with its fitness data, wherein determining the fitness data includes calculating an accuracy of the training data that is in the new current state, wherein the accuracy of the training data in the new current state is based on a first symbolic finite automaton for positive examples in the training data in the new current state, a second finite automaton for negative examples in the training data in the new current state, and a third symbolic finite automaton for the synthesized programs;
 f) filtering the synthesized programs based on each synthesized program's associated fitness data to obtain a new set of programs;
 g) returning to operation a) until the fitness data associated with a program achieves a desired fitness level or another stopping criterion is met; and
 h) selecting a program based upon the fitness data associated with that program for the programming task.

17. The one or more machine-readable storage media or hardware logic of claim 16, having further instructions comprising obtaining programs corresponding to regular expressions as at least part of the set of programs.

18. The one or more machine-readable storage media or hardware logic of claim 17, wherein blending the set of programs into the synthesized programs comprises using a crossover function or a mutation function, or both a crossover function and a mutation function.

19. The one or more machine-readable storage media or hardware logic of claim 18, wherein using the crossover function comprises using a first component of a first program in a second program and using a second component of the second program in the first program.

20. The one or more machine-readable storage media or hardware logic of claim 16, wherein the accuracy of the initial training set in the new current state is computed by performing one or more operations on a first intersection between the first symbolic finite automaton and the third symbolic finite automaton and a second intersection between the second symbolic finite automaton and the third symbolic finite automaton and values of the first symbolic finite automaton and the second symbolic finite automaton.

* * * * *